United States Patent [19]

Thomas

[11] 4,042,826
[45] Aug. 16, 1977

[54] ELECTRICAL CABLE

[75] Inventor: Harold A. Thomas, San Diego, Calif.

[73] Assignee: General Atomic Company, San Diego, Calif.

[21] Appl. No.: 588,232

[22] Filed: June 19, 1975

[51] Int. Cl.$^2$ ............................................. G01J 1/00
[52] U.S. Cl. .................................. 250/336; 250/374; 250/390
[58] Field of Search .......... 174/110 PM, 8, 10, 15 R, 174/9; 250/336, 374, 390

[56] References Cited

U.S. PATENT DOCUMENTS

| | | | |
|---|---|---|---|
| 1,991,230 | 2/1935 | Shanklin | 174/10 |
| 2,573,999 | 11/1951 | Victoreen | 250/374 |
| 3,110,835 | 11/1963 | Richter et al. | 250/374 |
| 3,760,183 | 9/1973 | Neissel | 250/390 |
| 3,840,694 | 10/1974 | Luczak | 174/110 PM |
| 3,860,824 | 1/1975 | Stone | 250/390 |
| 3,908,068 | 9/1975 | Thornley et al. | 174/110 PM |

Primary Examiner—Harold A. Dixon
Attorney, Agent, or Firm—Fitch, Even, Tabin & Luedeka

[57] ABSTRACT

An electrical cable is described wherein an inner conductor having one or more layers of radiation resistant organic insulation extends through a metal sleeve which is larger than the insulation to leave a space capable of accommodating thermal expansion of the insulation layer or layers and which may be filled with a non-reacting gas. Also described are a method for connecting such a cable, and a radiation sensor and cable assembly incorporating such a cable.

4 Claims, 2 Drawing Figures

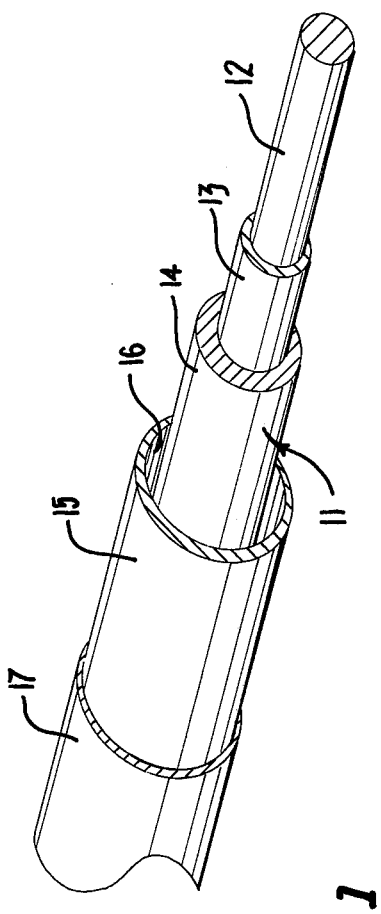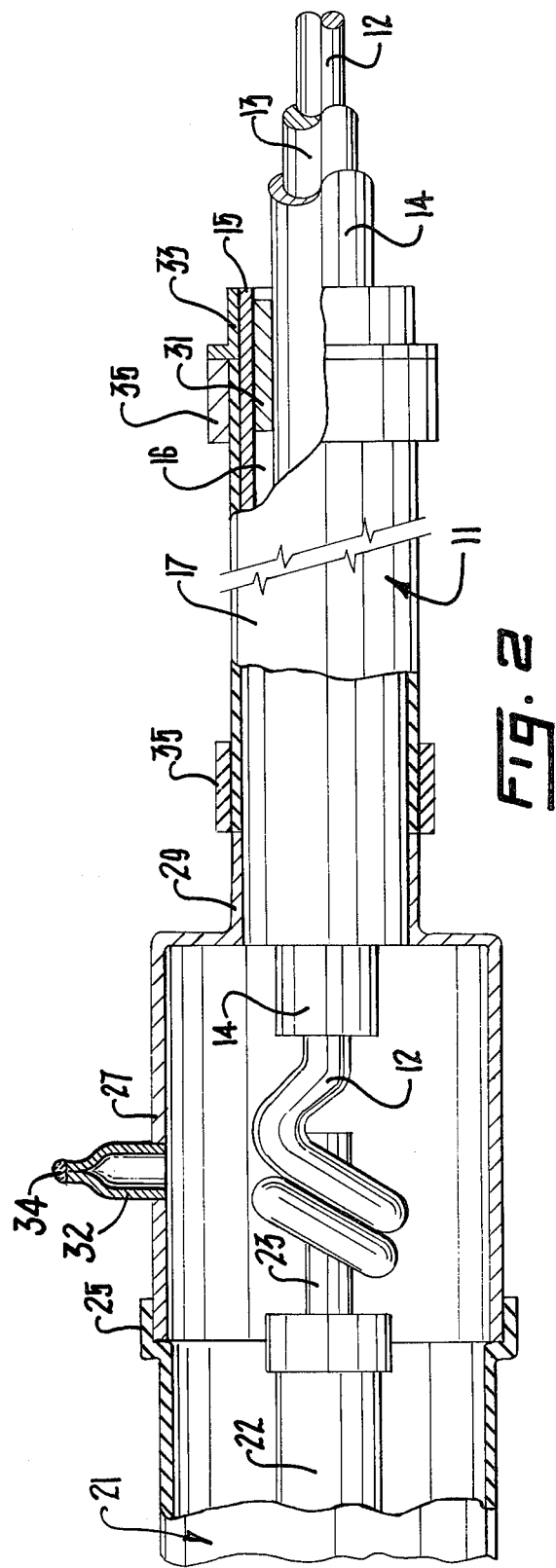

ELECTRICAL CABLE

This invention relates generally to electrical cables and, more particularly, to an improved electrical cable which is particularly suited for use in nuclear reactors and the like wherein it is subjected to high radiaiton levels.

Radiation sensors are usually employed in or near the core of a nuclear reactor for measuring neutron flux levels or other types of radiation at certain points. Typically, such radiation sensors produce electrical signals which relate to the radiation levels beings sensed. In order to transmit these electrical signals from the location of the radiation sensor to suitable indicating or recording equipment, electrical cables are employed which, of course, should be resistant to the high levels of radiation typically present in or near the reactor core.

Electrical cables used for the foregoing described purpose have typically, in the past, employed various types of insulation structures to provide the necessary radiation resistance. These cables have suffered from problems in respect to the quality of transmission and from susceptibility to electrical interference. For example, electrical cables employing mineral insulation have been expensive and have had poor high frequency transmission characteristics. Electrical cables employing quartz fiber insulation are also very expensive and have voltage breakdown problems at higher temperatures. Conventional electrical cables employing organic insulations have had short radiation lives and have been vulnerable to electrical interference.

It is an object of the present invention to provide an improved electrical cable.

Another object of the invention is to provide an improved electrical cable which has a long radiation life and a low susceptibility to electrical interference.

Another object of the invention is to provide an improved electrical cable which is low in cost, which has good high frequency transmission characteristics, and which has a low susceptibility to voltage breakdown problems.

Other objects of the invention will become apparent to those skilled in the art from the following description, taken in connection with the accompanying drawings wherein:

FIG. 1 is a perspective sectioned view of a portion of an electrical cable constructed in accordance with the invention; and FIG. 2 is a reduced size schematic view (partially sectioned) illustrating a manner in which the electrical cable of FIG. 1 may be connected.

Very generally, the electrical cable 11 of the invention comprises an inner conductor 12 and one or more layers 13 and 14 of radiation resistant organic insulation surrounding the inner conductor in contact therewith and coextensive therewith. A metal sleeve 15 is coextensive with the inner conductor and the invention layer or layers and has an inner diameter which is sufficiently greater than the outer diameter of the insulation layer or layers as to leave a substantial space 16 between the insulation layer or layers and the sleeve to accomodate thermal expansion of the insulation layer or layers. The metal sleeve is of an electrically conductive material and is of a thickness such that it is manually bendable.

More particularly, the inner conductor 12 is comprised of any suitable material such as copper, aluminum, silver, etc. The conductor 12 in FIG. 1 is shown as a solid conductor, however, the conductor 12 may be comprised of a plurality of strands, either straight or twisted, as is known in the art.

The inner conductor 12 is surrounded by one or more layers 13 of radiation resistant organic insulation. In the illustrated embodiment, the layer 13 is immediately adjacent the inner conductor in contact therewith and a layer 14, of slightly greater thickness, surrounds the layer 13 in contact therewith. Radiation resistant organic insulations are commercially available from various manufacturers. In a practical construction, the thin layer 13 may consist of polyarylene available from Raychem Corporation under the trade name STILAN. A relatively thicker layer 14 may then be comprised of a cross-linked polyethylene. The conductor 12 is, of course, flexible as are the insulation layers 13 and 14. By way of example, a conductor size of number 22, American Gage, may employ a layer 13 of about 10 mil thickness, such that the outer diameter of the insulation is about 0.160 inch.

The metal sleeve or tube 15 is coextensive with the inner conductor and the insulation layers. The sleeve 15 is of a high specific conductivity metal, such as for example aluminum, and is of a thickness which enables it to be manually bent and still provide a high conductivity. In the above example, a suitable sleeve outer diameter in 0.250 inch with a thickness of 0.030 inch leaving a gap of 0.015 inch. The sleeve 15 provides shielding for the conductor 12 from outside electrical interference as is known in the art. In addition, the sleeve 15 provides additional functions as described below.

For electrical insulation of the sleeve 15 from the reactor structure, an outer jacket 17 is provided. The jacket 17 may be a glass fiber braid which provides electrical insulation and yet which will flex with the sleeve 15. A material suitable for this purpose is obtainable from Varflex Corp. under the trademark "Varglas S 1600". Other combinations of dimensions and materials may be employed in accordance with the invention to obtain desired impedance and voltage characteristics.

In assembling the cable of FIG. 1, the conductor 12 with the insulation layers 13 and 14 is inserted into the sleeves 15. It may be seen that the inner diameter of the sleeve 15 is substantially larger than the outer diameter of the insulation layers, i.e. the outer surface of the layer 14. This leaves a substantial space 16 between the sleeve and the insulation layers. This not only allows ready insertion of the conductor and insulation layers into the tubing, but allows for thermal expansion of the layers 13 and 14 of organic insulation without completely occupying the space 16. Thus, the sleeve 15 is made sufficiently large so that the space 16 remains substantial even with the maximum design of thermal expansion for the insulation layers.

Because of the substantial size maintained in the space 16, the space 16 may be filled with a non-oxidizing gas. By non-oxidizing gas, it is intended to mean a single gas or mixture of gases which contain essentially no oxygen or in which the oxygen is sufficiently bound as to be non-reactive with the organic insulation in the layers 13 and 14. Since most organic insulations suffer chemical change and performance damage if exposed to high radiation in the presence of oxygen, the filling of the space 16 with a non-oxidizing gas prevents such change and damage. Preferably, the space 16 is first evacuated and then back-filled with "non-reacting"gas, such as dry nitrogen. It should be noted that because of the larger expansion coefficient of organic insulation over that of metal in the sleeve 15 it is not feasible to exclude the oxygen from contact with the insulation layers by swaging the sleeve 15 down tightly against the insulation as is done in the case of many mineral insulated stainless steel jacketed cables.

Referring now to FIG. 2, the manner in which the electrical cable of the invention is connected in a radiation sensing system in shown. Radiation sensor 21 may comprise any suitable radiation detector, such as an ion chamber 22 for detecting neutron flux. Suitable connection is made to one of the electrodes 23 of the ion chamber with one end of the inner conductor 12. The outer sleeve 15 is then grounded by welding the periphery of the end thereof to the housing 25 of the radiation detector. This is done by means of a cup-shaped connector 27 having a throat 29 in which the sleeve 15 is welded. This connection effectively seals that end of the sleeve. The opposite end of the cable 11 which is not exposed to the higher radiation levels may be sealed by epoxy 31 using a conventional technique. Prior to sealing at this end, the space 16 is evacuated and back-filled through a tube 32 with the inert gas as described above. After evacuation and back-filling, the tube 32 is pinched off and welded at 34 as shown in FIG. 2 to seal the assembly. A nut 33 facilitates connecting the sleeve 15 to a coaxial tube connector, not shown, and the glass fiber outer sleeve 17 is secured at both ends by clips 35.

The foregoing type of cable assembly may be termed an integral cable because the cable is permanently attached to he sensor or detector. This construction provides an electrical cable which is low in cost, has high radiation resistance, good radio frequency transmission characteristics, and low susceptibility to electrical interference.

Various modifications of the invention in addition to those shown and described herein will become apparent to those skilled in the art from the foregoing description and accompanying drawings, Such modifications are intended to fall within the scope of the appended claims.

What is claimed is:

1. An electrical cable comprising, a flexible inner conductor, at least one flexible layer of radiation resistant organic insulation surrounding said inner conductor in contact therewith and coextensive therewith, a metal sleeve coextensive with said inner conductor and said insulation layer and having an inner diameter which is sufficiently greater than the outer diameter of said insulation layer or layers as to leave a substantial space between said insulation layer or layers and said sleeve with maximum thermal expansion of said insulation layer or layers, said metal sleeve being of an electrically conductive material and a thickness such that it is manually bendable, said sleeve being sealed at both ends, and said space being filled with a non-reacting gas.

2. An electrical cable according to claim 1 wherein said non-reacting gas is dry nitrogen.

3. An electrical cable according to claim 1 wherein said conductor is surrounded by a flexible layer of polyarylene adjacent thereto and by a further and relatively thicker flexible layer of cross-linked polyethylene.

4. A radiation sensor and cable construction comprising, a radiation sensor, an inner flexible conductor electrically connected to said radiation sensor, at least one flexible layer of radiation resistant orgainc insulation surrounding said inner conductor in contact therewith and coextensive therewith, a metal sleeve spaced from and coextensive with said inner conductor and said insulation layer and having a inner diameter which is sufficiently greater than the outer diameter of said insulation layer or layers as to leave a substantial space between said insulation layer or layers and said sleeve with maximum thermal expansion of said insulation layer or layers, said metal sleeve being sealed at the end thereof at said sensor, said metal sleeve being of an electrically conductive material and a thickness such that it is manually bendable, said sleeve being sealed at the end thereof opposite said sensor, said space being filled with a non-reacting gas.

* * * * *

UNITED STATES PATENT AND TRADEMARK OFFICE
CERTIFICATE OF CORRECTION

PATENT NO. : 4,042,826
DATED : August 16, 1977
INVENTOR(S) : Harold A. Thomas

It is certified that error appears in the above-identified patent and that said Letters Patent are hereby corrected as shown below:

Col. 1, line 7    "radiaiton" should be --radiation--.

Col. 1, line 13   "beings" should be --being--.

Col. 1, line 58   "invention" should be --insulation--.

Col. 2, line 28   "in" should be --is--.

Col. 2, line 45   "sleeves" should be --sleeve--.

Col. 3, line 32   "he" should be --the--.

Col. 3, line 40   "," should be --.--.

Col. 4, line 26   "orgainc" should be --organic--.

Signed and Sealed this

Eleventh Day of April 1978

[SEAL]

Attest:

RUTH C. MASON
Attesting Officer

LUTRELLE F. PARKER
Acting Commissioner of Patents and Trademarks